3,705,886
PROCESS FOR POLYMERIZATION OR
COPOLYMERIZATION OF ETHYLENE
Norio Kashiwa, Otake, Tohoru Tomoshige, Iwakuni, and Toshio Kobayashi and Shiro Honma, Otake, Japan, assignors to Mitsui Petrochemical Industries, Ltd., Tokyo, Japan
No Drawing. Filed Nov. 23, 1970, Ser. No. 92,251
Claims priority, application Japan, Nov. 29, 1969, 44/95,396
Int. Cl. C08f 1/56, 3/06
U.S. Cl. 260—85.3
11 Claims

ABSTRACT OF THE DISCLOSURE

In the process for polymerizing ethylene or copolymerizing ethylene with a comonomer selected from the group consisting of 1-olefines having from 3 to 8 carbon atoms and diolefines having from 4 to 10 carbon atoms, in an inert solvent in the presence of a catalyst comprising a titanium or vanadium halogen compound bonded onto the surface of inorganic solid particles, and an organoaluminum compound or a dialkyl zinc; an improvement wherein said inorganic solid particles are particles of a synthetic double oxide of magnesium and aluminum, and said synthetic double oxide has the atomic ratio of Mg/Al in the range of from 0.02 to 100.

---

This invention relates to an improvement of the conventional process for polymerizing or copolymerizing ethylene in an inert solvent in the presence of a catalyst comprising a transition metal halogen compound bonded onto the surface of inorganic solid particles, and an organoaluminum compound or a dialkyl zinc.

More specifically, this invention relates to an improvement of said conventional process for the polymerization or copolymerization of ethylene, wherein as inorganic solid particles there are used:

(i) particles of a synthetic double oxide of magnesium and aluminum,
(ii) said synthetic double oxide having the atomic ratio of Mg/Al in the range of from 0.02 to 100.

With regard to said conventional process, there have been made the following proposals. U.S. Pat. 3,166,542 (patented on Jan. 9, 1965) teaches that it is essential to use as said inorganic solid particles finely divided inorganic solids having an average equivalent particle diameter of less than about 1 micron, especially of less than about 0.1 micron, and it claims the use of a finely divided inorganic solid having an average particle diameter of less than about 0.1 micron.

In this proposal, as preferable inorganic solid there are cited metal oxides such as alumina, titania, zirconia, silica, thoria and magnesia; silicates such as chrysotile, actinolite and crocidolite; and aluminates such as corundum and bauxite. With reference to the inorganic solid and the particle diameter thereof, said proposal discloses that the smaller the particle size of the inorganic solid and the larger the quantity of hydroxyl groups on the surface thereof, the greater will be the potential activity and efficiency of the resulting catalyst component producible therefrom.

Belgian Pat. No. 705,220 (patented on Oct. 17, 1967) proposes a similar catalyst system where no specific restriction is given to the particle diameter, and according to this proposal it is preferable to use a solid having an average particle diameter as large as 0.1 mm. (100μ).

In this proposal, as preferable solid there are cited oxides, sulfates, nitrates, phosphates, silicates, and mono- and poly-carboxylates of divalent metals such as magnesium and calcium.

According to this proposal, it is essential that the reaction between the solid particles and the transition metal compound should be allowed to occur on the particle surface where the quantity of hydroxyl groups is small.

With reference to the solid particle diameter and the hydroxyl group on the particle surface, the above two proposals teach recognitions contradictory to each other. On the other hand, with reference to usable solids, they, in common, teach a considerable number of overlapping compounds.

However, the former proposal is quite silent to hydroxides, particularly magnesium hydroxide and the usability thereof is unobvious from the former proposal, while the latter proposal expresses a negative recognition concerning the use of hydroxides to the effect that they do not exhibit any good catalytic activity.

As the third proposal there is cited British Pat. No. 1,024,336, whose corresponding Belgian Pat. No. 650,679 is introduced as the prior art in the above described second proposal.

This third proposal teaches the use, as said solid compound, of hydroxychlorides of divalent metals such as magnesium, calcium, cadmium, zinc, and ferrous iron. However, this proposal discloses that a catalyst comprising titanium tetrachloride as transition metal component bonded to the surface of particles of a hydroxide of any of the above described divalent metals, for instance, $Ca(OH)_2$ is entirely inactive for the polymerization of propylene.

We had some doubts about the fact that the use of hydroxides of divalent metals is neglected or positively denied by these proposals and that the above described first and second proposals teach recognitions quite contradictory to each other with reference to the particle diameter of the solid and the quantity of the hydroxyl group present on the particle surface. Accordingly, we made research in this field and found that when magnesium hydroxide particles having an average particle diameter exceeding 1 micron but not greater than 70 microns and a specific surface area in the range of from 20 to 100 m.²/g. are used as inorganic solid particles for the polymerization or copolymerization of ethylene, excellent results are obtained. Based on this finding, we once proposed an improved process for the polymerization or copolymerization of ethylene (U.S. patent application Ser. No. 775,901, filed Nov. 14, 1968).

We furthered our research in this field and found that the above-mentioned particles of a synthetic double oxide of magnesium and aluminum give excellent results as solid particles for catalysts in use for the polymerization or copolymerization of ethylene.

As introduced hereinabove, U.S. Pat. 3,166,542 teaches the use of solid particles of metal oxides such as alumina and magnesia, and aluminates of natural source such as corundum and bauxite. The above-introduced Belgian Pat. No. 705,220 teaches the use of solid particles of oxygen-containing compounds of divalent metals such as magnesium and calcium, and oxygen-containing compounds of zinc.

However, these proposals are quite silent to the use of solid particles of a synthetic double oxide of magnesium and aluminum.

As will be shown in examples, and comparative examples, the above-mentioned double oxide to be used in this invention can attain highly improved results that will not be attained by single use of an aluminum oxide or magnesium oxide, or by use of a mixture of both oxides, or by utilization of aluminates of natural source.

The above improved results are particularly prominent when the atomic ratio of Mg/Al in the double oxide is in the range of from 0.02 to 100. Thus it was found that said atomic ratio is critical.

It has now been found that polymers or copolymers of ethylene which have a broad molecular weight distribution range and an excellent shapeability and are hardly colored can be prepared at a high catalytic activity by utilization of such double oxide as solid particles for catalysts; when such double oxide is used, it is possible to omit the operation of deactivating the catalyst and even if the said operation is omitted, as the amount used of the transition metal compound can be reduced, there is no fear of degradation of resulting polymers; and that as the carrier does not contain any halogen, polymers or copolymers of ethylene which do not cause rusting on a shaping machine when they are shaped can be prepared with good reproducibility.

Accordingly, the primary object of this invention is to provide a process for the polymerization or copolymerization of ethylene in which the above-mentioned improved results are obtained by using as inorganic solid particles, particles of a synthetic double oxide of magnesium and aluminum having the atomic ratio of Mg/Al in the range of from 0.02 to 100.

Other objects and advantages of this invention will be revealed hereinbelow.

The process of this invention may be applied to not only the polymerization of ethylene but also the copolymerization of ethylene with a comonomer copolymerizable with ethylene. As such comonomer there may be cited 1-olefines having from 3 to 8 carbon atoms, such as propylene, 1-butene, 1-hexene and styrene, and diolefines having from 4 to 10 carbon atoms, such as butadiene, isoprene, ethylidenenorbornene, and dicyclopentadiene.

The amount used of the comonomer may be changed depending on the intended properties of the resulting copolymer, but generally it is used in an amount of less than 60 mole percent. For instance, it may be preferably used in an amount of less than about 50 mole percent.

As described above, the inorganic solid particles to be used in the process of this invention should satisfy the following requirements:

(i) They are particles of a synthetic double oxide of magnesium and aluminum, and
(ii) Said double oxide has the atomic ratio of Mg/Al in the range of from 0.02 to 100.

So far as the above requirements are satisfied, the double oxide may contain as metal constituents other metal elements such as titanium, nickel, silicon, iron, cobalt and vanadium, in such small amounts that the atomic ratio of these metal elements to the sum of magnesium and aluminum (other metal elements/magnesium plus aluminum) is in the range of from 0.001 to 0.3.

By the "synthetic double oxide of magnesium and aluminum" used herein are meant products synthesized from magnesium or magnesium compounds and aluminum or aluminum compounds, exclusive of those prepared by mere mixing of magnesium and aluminum components. The synthesis may be conducted by methods known per se. Although the detailed structure of the double oxide of magnesium and aluminum has not been completely elucidated, it is conjectured that magnesium and aluminum atoms are bonded to one another complicatedly via oxygen atoms.

As the method of synthesizing such double oxide, there may be cited a so-called co-precipitating method comprising mixing an aqueous solution of a magnesium salt of an inorganic or organic acid such as magnesium chloride or magnesium acetate, with an aqueous solution of an aluminum salt of an inorganic or organic acid such as aluminum nitrate or aluminum acetate, adding gradually an alkaline substance such as aqueous ammonia dropwise to the mixture under stirring and thereby forming precipitates; and a so-called co-gelling method comprising suspending water-insoluble magnesia, magnesium hydroxide, magnesium carbonate or the like in water, and reacting the suspension with an aqueous solution of an aluminum salt of an inorganic or organic acid to thereby form a gel.

When the synthetic double oxide is expressed by a conventional composition formula where both oxides of magnesium and aluminum are expressed as complete oxides, it is defined as follows:

$$m\text{MgO} \cdot \text{AlO}_{1.5} \cdot n\text{H}_2\text{O}$$

in which $m$ is a positive number of from 0.02 to 100, preferably from 0.1 to 10, especially preferably from 1 to 5, and $n$ is 0 (zero) or a positive number up to 4.

Although it is permissible that small amounts of carbonic, sulfuric and nitric radicals originated from starting materials used for the synthesis of the carrier may remain in the synthetic double oxide, the amount of such remaining radicals should not exceed 2% by weight based on the whole carrier.

The synthetic double oxide to be used in this invention has the atomic ratio of Mg/Al in the range of from 0.02 to 100, preferably from 0.1 to 10, especially preferably from 1 to 5. In case the above atomic ratio exceeds the above range and the magnesium content is too high, the catalytic activity is heightened but the molecular distribution in the resulting polymer of ethylene becomes narrow. On the other hand, in case the atomic ratio is below the above range and the aluminum content is too high, the catalytic activity is lowered and the transition metal content in the resulting polymer of ethylene increases, with the consequence that the resulting polymer is colored and it must be subjected to the post treatment prior to its actual utilization.

It is preferable that particles of the synthetic double oxide of magnesium and aluminum to be used in this invention have an average particle diameter exceeding about 0.1 micron but not greater than 100 microns and a specific surface area of not less than 20 m.²/g. In a particularly preferred embodiment, said particles of the synthetic double oxide of magnesium and aluminum have an average particle diameter exceeding 1 micron but not greater than 70 microns and a specific surface area in the range of from 40 to 500 m.²/g. A more preferred average particle diameter is in the range of from 3 to 50 microns.

By the term "average particle diameter" used in this invention it is indicated not only that the average value of diameters of particles is in the specified range of the average particle diameter but also that at least 80% by weight of particles have a diameter fallen within said specified range. The value of "specific surface area" referred to in this invention is one measured by the nitrogen adsorption in accordance with BET method.

In this invention, a preferable water content of the synthetic double oxide shown in the above formula, and the above-mentioned preferable particle size and specific surface area may be provided by a suitable combination of the heat treatment and sieving step. The heating treatment may be carried out under conditions such as temperatures of 200–1000° C. and treating times of 20 minutes–10 hours.

The transition metal component of the catalyst to be used in this invention is bonded onto the surface of particles of the above-mentioned synthetic double oxide of magnesium and aluminum. As such transition metal component there may be cited titanium or vanadium halogen compounds selected from the group consisting of titanium tetrahalides, alkoxy titanium trihalides, dialkoxy titanium dihalides, trialkoxy titanium halides, vanadium tetrahalides, and vanadium oxytrihalides.

Examples of these compounds are titanium tetrachloride, titanium tetrabromide, ethoxy titanium trichloride, di(n-butoxy) titanium dichloride, titanium tri(iso-propoxy) chloride, vanadium tetrachloride, vanadium oxytrichloride, etc.

In this invention, various methods may be adopted for bonding such transition metal component onto the above-mentioned synthetic double oxide of magnesium and aluminum. This can be performed preferably by immersing the solid particles of the synthetic double oxide into the titanium or vanadium halogen compound generally at a temperature ranging from room temperature to 300° C., preferably from 80 to 200° C. for about 30 minutes to about 5 hours, though these conditions are not necessarily critical. Of course, the above treatment is performed in the substantial absence of oxygen and water, generally in an atmosphere of an inert gas. The above treatment may be conducted in the presence of a suitable inert solvent such as hexane and kerosene.

After the above treatment, the unreacted titanium or vanadium halogen compound is removed by filtration or decantation. Thereafter, solid particles of the synthetic double oxide onto which the titanium or vanadium halogen compound has been bonded are usually washed with a suitable inert solvent such as hexane, heptane and kerosene to remove the unsupported or unbonded titanium or vanadium halogen compound therefrom.

When the so washed solid particles are used as catalyst component, they are suspended in an inert solvent or formed into solid powder by volatilizing the washing liquor in a dry inert gas stream or under reduced pressure. Although deposition of not bonded titanium or vanadium compound on the particles is not preferable, the deposition of a slight amount of such unbonded compound is permissible as long as the object of this invention is not hindered by the existence of such unbonded compound.

As another method of bonding the titanium or vanadium halogen compound onto the solid particles of the synthetic double oxide of magnesium and aluminum, there may be cited a method comprising maintaining the synthetic double oxide at 20 to 500° C., preferably 20 to 250° C. and contacting the same with the transition metal compound accompanying an inert gas such as nitrogen and argon.

By the above-mentioned methods, the titanium or vanadium halogen compound can be bonded onto the surface of solid particles of the synthetic double oxide of magnesium and aluminum.

A preferable amount of the titanium or vanadium catalyst component thus bonded onto the surface of solid particles of the synthetic double oxide is usually in the range of from 0.1 to 300 mg., calculated as titanium or vanadium atom, per gram of the carrier.

In this invention, as one component of the catalyst are used the so prepared solid particles of the synthetic double oxide carrying a titanium or vanadium catalytic component bonded to the surface thereof, and as the other component of the catalyst is used an organoaluminum compound or dialkyl zinc.

As the organometallic compound having an olefin polymerization activity which is used in combination with the above described titanium or vanadium compound supported or bonded on the synthetic double oxide, there can be cited organoaluminum compounds of the formulas, $R_3Al$, $R_2AlX$, $RAlX_2$, $R_2AlOR$, $RAl(OR)X$ and $R_3Al_2X_3$ (in which R stands for an alkyl or aryl group, and X stands for a halogen atom), and dialkyl zinc compounds of the formula $R_2Zn$ (in which R stands for an alkyl group).

The specific examples of the organometallic compounds are trialkylaluminum such as triethylaluminum, tripropylaluminum and tributylaluminum; dialkylaluminum halides such as diethylaluminum chloride, diethylaluminum bromide, dibutylaluminum chloride and dibutylaluminum bromide; dialkylaluminum alkoxides such as diethylaluminum ethoxide; dialkylaluminum phenoxides such as diethylaluminum phenoxide; dialkylaluminum hydrides such as diethylaluminum hydride and dibutylaluminum hydride; alkylaluminum alkoxyhalides such as ethylaluminum ethoxychloride; alkylaluminum sesquihalides such as ethylaluminum sesquichloride; and diethyl zinc and dibutyl zinc.

With reference to the mixing ratio of both components of the catalyst, it is preferred that 0.5 to 300 moles of aluminum or zinc atom are used per mol of titanium or vanadium atom bonded onto the surface of solid particles of synthetic double oxide of magnesium and aluminum. The concentration used of the catalyst can be changed, but preferred concentrations are such that about 0.005 to 10 g., preferably 20 to 400 mg. of solid particles carrying the titanium or vanadium compound bonded thereto and 0.1 to 50 mmoles of the organoaluminum or dialkyl zinc compound are contained in 1 liter of a solvent.

The catalyst to be used in this invention is composed of three components, namely a transition metal halogen compound, an organometallic compound and a carrier of a synthetic double oxide of magnesium and aluminum. A catalyst free of either of the former two components, namely a catalyst comprising a synthetic double oxide of magnesium and aluminum, and an organometallic compound or a transition metal halogen compound, does not exhibit an olefin-polymerizing activity. In the preparation of the catalyst it is essential to support a transition metal compound on a synthetic double oxide of magnesium and aluminum in advance and then add an organometallic compound thereto. When the three components are merely blended, any specific effect is not attained by the use of the synthetic double oxide carrier.

The polymerization or copolymerization of ethylene with the use of the catalyst of this invention is conducted in a similar manner as the ethylene polymerization or copolymerization reaction using a Ziegler-type catalyst. In other words, the polymerization or copolymerization of this invention is carried out in the substantial absence of oxygen and water. A preferable inert solvent such as hexane, heptane and kerosene may be used. The catalyst is added to such solvent, and the polyermization of ethylene is allowed to advance by feeding ethylene or ethylene and a comonomer to the solvent containing the catalyst. The polymerization temperature is generally in the range of 20 to 250° C., preferably 60 to 180° C. The polymerization is generally performed at a pressure ranging from atmospheric pressure to an elevated pressure of 100 kg./cm.$^2$, but it is preferred to carry out the polymerization under an elevated pressure of 2 to 60 kg./cm.$^2$.

The catalyst system of the present invention may be applied to solution polymerization at elevated temperatures as well as slurry polymerization.

In the polymerization or copolymerization of ethylene with the use of the catalyst of this invention, it is possible to adjust the molecular weight to some extent by changing the polymerization conditions such as polymerization temperature and the molar ratio of the catalyst components, and the addition of hydrogen to the polymerization system is effective for attaining said purpose.

Various known additives used for the polymerization or copolymerization of ethylene using a Ziegler-type catalyst may be used in the process of this invention. For instance, techniques of increasing yields or improving bulk density of resulting polymers by adding polysiloxanes or ethers to the polymerization system may be utilized in the process of this invention.

In addition to the already described advantages, the use of the catalyst system of this invention brings about the following advantages:

Since the amount used of the titanium or vanadium compound is so small per unit quantity of the resulting polyethylene, the treatment after the polymerization can be extremely simplified or in many cases, it is unnecessary. In other words, since the amount of the titanium or vanadium compound used in this invention is very small and the titanium or vanadium compound is very thinly supported or bonded on the surface of the synthetic double oxide carrier, the deactivation of the titanium or vanadium compound can be performed comparatively with ease. Further, the titanium or vanadium compound, even if it is not deactivated deliberately with, for instance, alcohol, hardly gives any deteriorative influence to the resulting polyethylene, because it is contained in the catalyst only in a very small amount. Still further, since the carrier to be used is free of halogen, even if it remains in the resulting polyethylene, it does not cause any occurrence of rust on a mould or the like during the processing procedures, and it hardly discolors or degrades polyethylene shaped articles.

Some embodiments of the proess of this invention will now be explained by referring to examples and comparative examples.

EXAMPLE 1

3.05 kg. of magnesium chloride (hexahydrate) was dissolved in 7.5 liters of distilled water, and separately, 1.91 kg. of aluminum nitrate (nonahydrate) was dissolved in 6.8 liters of distilled water. Both solutions were mixed together, and 3 liters of 28% aqueous ammonia was gradually added dropwise to the mixture under stirring. After completion of the dropwise addition, the stirring was continued for 1 hour. Then, the mixture was allowed to stand still overnight. The resulting precipitate was recovered by filtration, washed sufficiently with distilled water and dried at 80° C. for 24 hours under reduced pressure. Thus there was obtained 1.19 kg. of a synthetic double oxide of magnesium and aluminum expressed by the composition formula of $3\ MgO \cdot AlO_{1.5} \cdot 4H_2O$. The resulting double oxide was characterized by an atomic ratio of Mg/Al of 3 and a specific surface area, determined by the BET method, of 96 m.$^2$/g. This double oxide (800 g.) was heated at 600° C. for 1 hour in a nitrogen current. The so heat treated solid had a specific surface area of 176 m.$^2$/g., and when it was heated at 950° C. for 2 hours, 2% decrease of the weight was observed.

The so prepared carrier had an average particle diameter of about 20 microns. The carrier (300 g.) was suspended in 1500 ml. of titanium tetrachloride, and the suspension was heated at 135° C. for 1 hour. After completion of the heating, the solids were recovered by filtration, and washed sufficiently with refined hexane to remove free titanium tetrachloride. Then the solids were dried. Thus there was obtained a carrier-titanium component in which the titanium compound was bonded to the solid carrier in an amount of 15 mg. titanium atom per gram of the solid (carrier).

A 500-liter capacity autoclave was charged with 200 liters of kerosene and its atmosphere was sufficiently replaced by nitrogen. Then, 1 mmole per liter kerosene of triethyl aluminum and 100 mg. per liter of kerosene of the above solid carrier-titanium component were added into the autoclave. Then the temperature of the system was raised to 140° C., and hydrogen was introduced thereinto at a partial pressure of 6 kg./cm.$^2$. Ethylene was introduced under pressure continuously for 1 hour so that the total pressure would be maintained at 40 kg./cm.$^2$. After termination of the polymerization, the system was cooled to reduce the pressure. The resulting polymer was recovered, washed sufficiently with hexane and dried in vacuo for 24 hours. As a result there was obtained 18.4 kg. of polyethylene having a melt index of 0.42. The yield of polyethylene per milligram atom of titanium was 2940 g. The $\overline{M}_w/\overline{M}_n$ value of the polyethylene was 20.1. ($\overline{M}_w$ stands for the weight average molecular weight and $\overline{M}_n$ stands for the number average molecular weight. Polyethylene for blow molding should possess the $\overline{M}_w/\overline{M}_n$ value of at least 10, preferably at least 15.) A bottle was prepared from this polyethylene by a blow molding technique. The extrusion pressure was low and the resulting bottle had a beautiful surface.

COMPARATIVE EXAMPLE 1

400 g. of magnesia powder was heated at 400° C. for 1 hour. The resulting calcined magnesia powder (200 g.) was suspended in 1400 ml. of titanium tetrachloride, and a catalyst component supported on a carrier was prepared with use of this suspension in the same manner as in Example 1. The titanium compound was supported in an amount of 10 mg. titanium atom per gram of the magnesia carrier.

With use of the so prepared magnesia carrier-titanium component, polymerization of ethylene was performed in the same manner as in Example 1 except that the partial pressure of hydrogen was changed to 1 kg./cm.$^2$. The amount used of the above catalyst component was 100 mg. per liter of kerosene. As a result, there was obtained 18.8 kg. of polyethylene having a melt index of 0.41. The polyethylene yield per milligram atom of titanium was 4510 g. The polymer had a $\overline{M}_w/\overline{M}_n$ value of 6. When the preparation of a bottle was tried with use of the so obtained polyethylene by a blow molding technique, since the extrusion pressure became extremely high, the molding was very difficult and fish eyes were caused to appear on the inner and outer surfaces of the bottle, particularly on the inner surface. Accordingly, the resulting bottle was of no commercial value.

COMPARATIVE EXAMPLE 2

200 g. of alumina was calcined at 400° C. for 1 hour. The specific surface area of the calcined product was 120 m.$^2$/g. This calcined alumina (200 g.) was suspended in 1400 ml. of titanium tetrachloride, and they were reacted in the same manner as in Example 1 to prepare an alumina carrier-titanium component in which the titanium compound was supported on the carrier in an amount of 22 mg. titanium atom per gram of the carrier. With use of the so prepared alumina carrier-titanium component, ethylene was polymerized under the same conditions as in Example 1. The amount used of the above catalyst component was 100 mg. per liter of kerosene. As a result there was obtained only 1.0 kg. of polyethylene having a melt index of 0.05. The polyethylene yield per milligram atom of titanium was 110 g.

COMPARATIVE EXAMPLE 3

A carrier was prepared by blending magnesia and alumina used in Comparative Examples 1 and 2 in such proportions that the atomic ratio of Mg/Al in the blend would be the same as in Example 1 (Mg/Al=3). The carrier was reacted with titanium tetrachloride in the same manner as in Example 1. Thus there was obtained a carrier-titanium component in which 15 mg. titanium atom was supported per gram of the carrier.

With use of the so prepared carrier-titanium component, ethylene was polymerized under the same conditions as in Comparative Example 1 to obtain 12.3 kg. of polyethylene having a melt index of 0.28. The polyethylene yield per milligram atom of titanium was 1970 g. The $\overline{M}_w/\overline{M}_n$ value of this polyethylene was 6. When the polyethylene was blow-molded into a bottle, the extrusion pressure became extremely high, and formation of fish eyes was extreme in the product bottle. Accordingly, it was of no commercial value.

The results of Example 1 and Comparative Examples 1 to 3 are shown in Table 1. In Table 1 there are also shown the results of the run where Example 1 was repeated by using as an aluminate of natural source bauxite having an average particle diameter of about 20 microns instead of the synthetic double oxide of magnesium and aluminum used in Example 1.

TABLE 1

|  | Example 1 | Comparative Example 1 | Comparative Example 2 | Comparative Example 3 | Comparative Example 4 |
|---|---|---|---|---|---|
| Kind | Synthetic double oxide of Mg and Al. | MgO | $Al_2O_3$ | Mixture of MgO and $Al_2O_3$. | Bauxite. |
| Carrier: Mg/Al atomic ratio | 3/1 | 1/0 | 0/1 | 3/1 | |
| Kind | $TiCl_4$ | $TiCl_4$ | $TiCl_4$ | $TiCl_4$ | $TiCl_4$. |
| Titanium compound: | | | | | |
| Amount of titanium supported (mg./g.)[1] | 15 | 10 | 22 | 15 | 33. |
| Amount used (mg./of solvent) | 100 | 100 | 100 | 100 | 100. |
| Solvent | Kerosene | Kerosene | Kerosene | Kerosene | Kerosene. |
| Organoaluminum compound: | | | | | |
| Kind | $(C_2H_5)_3Al$ | $(C_2H_5)_3Al$ | $(C_2H_5)_3Al$ | $(C_2H_5)_3Al$ | $(C_2H_5)_3Al$. |
| Amount used (mmole)[2] | 1 | 1 | 1 | 1 | 1. |
| Polymerization conditions: | | | | | |
| Partial pressure of hydrogen (kg./cm.[2]) | 6 | 6 | 6 | 6 | 6. |
| Total pressure (kg./cm.[2]) | 40 | 40 | 40 | 40 | 40. |
| Time (hr.) | 1 | 1 | 1 | 1 | 1. |
| Temperature (° C.) | 140 | 140 | 140 | 140 | 140. |
| Yield (kg.) | 18.4 | 18.8 | 1.0 | 12.3 | 1.5. |
| Polyethylene: | | | | | |
| Polymerization activity (g./mg. atom)[3] | 2,940 | 4,510 | 110 | 1,970 | 110. |
| MI[4] | 0.42 | 0.41 | 0.05 | 0.28 | 0.02. |
| $\bar{M}_w/\bar{M}_n$ | 20.1 | 6.0 | 8.4 | 6.0 | 8.8. |
| Moldability: Extrusion pressure | Low | Extremely high | High | Extremely high | High. |
| Surface conditions | Smooth | Fish eyes | Fish eyes | Fish eyes | Fish eyes. |

[1] Milligram titanium atom per gram carrier of the supported titanium compound.
[2] Mmole of the organoaluminum compound used per litre of the solvent.
[3] The polymer yield per milligram atom of titanium.
[4] Melt index.

EXAMPLE 2

With use of the carrier-titanium component prepared in Example 1, ethylene was polymerized under the same conditions as in Example 1 by varying the kind of the organoaluminum or dialkyl zinc component. Results are shown in Table 2.

TABLE 2

| Organoaluminum or dialkyl zinc compound | Yield of polyethylene (kg.) | Polyethylene yield, (g.)/mg. atom of titanium | $\bar{M}_w/\bar{M}_n$ |
|---|---|---|---|
| $(C_2H_5)_2AlCl$ | 13.2 | 2,110 | 19.8 |
| $(C_2H_5)AlCl_2$ | 7.0 | 1,120 | 17.4 |
| $(C_2H_5)_{1.5}AlCl_{1.5}$ | 4.6 | 740 | 18.3 |
| $(C_2H_5)_2Al(OC_2H_5)$ | 3.1 | 560 | 17.2 |
| $(C_2H_5)_2Zn$ | 3.3 | 530 | 19.1 |

EXAMPLE 3

A mixture of an aqueous solution of magnesium chloride and an aqueous solution of aluminum nitrate was hydrolyzed with ammonia, and the resulting precipitate was dried at 100° C. and heated at 600° C. for 1 hour in a nitrogen current. Catalyst components having an average particle diameter of about 20 microns and a specific surface area of 100 m.²/g. were prepared with use of the so prepared double oxide, while changing the atomic ratio (Mg/Al) in the carrier. Ethylene was polymerized under the same conditions as in Example 1 by using the so formed caalyst components, individually. Results are shown in Table 3.

TABLE 3

| Mg/Al atomic ratio | Amount bonded of titanium (mg./g. carrier) | Yield (kg.) | Yield, (g.)/mg. atom of titanium | Melt index | $\bar{M}_w/\bar{M}_n$ | Appearance of molded article |
|---|---|---|---|---|---|---|
| 100 | 12 | 19.0 | 3,800 | 1.35 | 10 | Shark skin formed slightly. |
| 10 | 13 | 18.4 | 3,400 | 0.41 | 12 | Shark skin formed very slightly. |
| 5 | 13 | 19.0 | 3,520 | 0.84 | 16 | Good. |
| 4 | 20 | 16.0 | 1,820 | 0.61 | 19 | Do. |
| 2 | 23 | 16.1 | 1,680 | 0.72 | 18 | Do. |
| 1 | 27 | 12.2 | 1,090 | 0.38 | 16 | Do. |
| 1/2 | 31 | 8.0 | 620 | 0.33 | 13 | Do. |
| 1/10 | 33 | 8.4 | 610 | 0.30 | 12 | Shark skin formed very slightly. |
| 1/50 | 40 | 4.6 | 280 | 0.10 | 10 | Shark skin formed slightly. |

EXAMPLE 4

The same double oxide of magnesium and aluminum as used in Example 1 was subjected to the heat treatment at various temperatures. With use of the so heat treated products were prepared carrier-titanium components in the same manner as in Example 1. Ethylene was polymerized under the same conditions as in Example 1 by using 100 mg. per liter of kerosene of the so prepared carrier-titanium component and 1 mmole per liter of kerosene as the polymerization catalyst. Results are shown in Table 4.

TABLE 4

| Heat treatment conditions | Carrier: Weight loss by heat treatment at 950° C. for 2 hours, percent | Specific surface area (m²/g.) | Amount bonded of titanium (mg./g. carrier) | Polyethylene Yield (kg.) | Yield (g.)/mg. atom of Ti | Melt index | $\bar{M}_w/\bar{M}_n$ | Appearance of blow-molded bottle |
|---|---|---|---|---|---|---|---|---|
| 300° C. ×1 hour | 9.1 | 110 | 24 | 19.7 | 1,970 | 1.31 | 15.0 | Good. |
| 400° C. ×1 hour | 4.1 | 165 | 18 | 18.2 | 2,430 | 0.84 | 19.8 | Do. |
| 800° C. ×1 hour | 0.5 | 153 | 15 | 18.6 | 2,980 | 0.41 | 21.3 | Do. |

EXAMPLE 5

300 g. of the heat-treated carrier prepared in the same manner as in Example 1 was reacted with 5 ml. per gram of the carrier of a transition metal compound indicated in Table 5 below, to form a carrier-transition metal component. With use of the so prepared carrier-transition metal component, ethylene was polymerized under the conditions indicated in Table 5. Results are shown in Table 5.

TABLE 5

| Transition metal compound | Carrier-transition metal component Amount Bonded of Ti or V (mg./g. carrier) | Polymerization conditions Temperature (° C.) | Polymerization conditions Hydrogen partial pressure (kg./cm.²) | Polymerization conditions Total pressure (kg./cm.²) | Polyethylene Yield (kg.) | Polyethylene Melt index | Polyethylene Yield (g.)/ milligram atom of transition metal | Polyethylene $\overline{M}_w/\overline{M}_n$ |
|---|---|---|---|---|---|---|---|---|
| TiBr₄ | 16 | 140 | 2 | 40 | 15.8 | 0.04 | 2,370 | 19.5 |
| Ti(n-butoxy)Cl₃ | 20 | 180 | 6 | 40 | 12.1 | 0.43 | 1,450 | 18.8 |
| VCl₄ | 23 | 160 | 4 | 40 | 17.4 | 0.82 | 1,930 | 17.3 |
| VOCl₃ | 23 | 160 | 4 | 40 | 16.6 | 0.75 | 1,840 | 17.4 |
| Ti(ethoxy)₂Cl₂ | 20 | 80 | 4 | 8 | 12.2 | 0.51 | 1,460 | 20.1 |

Common conditions.—(1) 200 liters of kerosene used as polymerization solvent; (2) Triethylaluminum concentration=2 mmole/liter solvent: (3) Carrier-transition metal component concentration=100 mg./liter solvent; (4) Polymerization time=1 hour.

EXAMPLE 6

A 500-liter capacity autoclave was charged with 200 liters of refined hexane, and 2 mmoles per liter of hexane and 100 mg. per liter of hexane of the carrier-transition metal component prepared in the same manner as in Example 1. The temperature of the system was raised to 140° C. and hydrogen was introduced at a partial pressure of 6 kg./cm.². Then, an ethylene-butene-1 mixed gas containing 0.8 mole percent of butene-1 was introduced into the system continuously under pressure so that the total pressure would be maintained at 40 kg./cm.². As a result there was obtained 18.0 kg. of polyethylene having a melt index of 0.65 and a $\overline{M}_w/\overline{M}_n$ value of 19.4 and containing three ethyl groups per 1000 carbon atoms. Formation of fish eyes was not observed on a bottle blow-molded from this polyethylene, and the appearance of the bottle was very beautiful.

EXAMPLE 7

About 20 g. of the double oxide carrier prepared in Example 1 was placed on a glass filter disposed in the central portion of a quartz glass reaction tube having a diameter of 30 mm. and a length of 900 mm. The carrier was fluidized by introducing a nitrogen gas current from the lower portion of the reaction tube, and in this state the heating was effected from the outside of the reaction tube to maintain a prescribed temperature. A titanium tetrachloride-saturated nitrogen gas formed by passing titanium tetrachloride liquor of room temperature through nitrogen gas was introduced into the reaction tube while maintaining the carrier in the fluidized state, to thereby react the carrier with titanium tetrachloride at the prescribed temperature. Completion of the reaction was ascertained by an abrupt increase of the titanium tetrachloride concentration in the waste gas withdrawn from the upper portion of the reaction tube. Generally, the reaction was completed within 20–30 minutes.

After completion of the reaction, the resulting carrier-titanium component was charged in an autoclave similar to that used in Example 1, and ethylene was polymerized in the same manner as in Example 1. The temperature adopted for the preparation of the carrier-titanium component and the yield and $\overline{M}_w/\overline{M}_n$ value of the resulting polymer are shown in Table 6.

TABLE 6

| Temperature of reaction between TiCl₄ and carrier (° C.) | Amount bonded of titanium (mg. Ti/g. carrier) | Polymerization conditions Carrier-Ti component concentration (mg./liter solvent) | Polymerization conditions Partial pressure of hydrogen (kg./cm.²) | Polyethylene Yield (kg.) | Polyethylene Yield, (g.)/mg. atom of Ti | Polyethylene Melt index | Polyethylene $\overline{M}_w/\overline{M}_n$ |
|---|---|---|---|---|---|---|---|
| Room temperature | 15 | 100 | 8 | 12.6 | 2,020 | 0.42 | 18.7 |
| 180 | 16 | 100 | 6 | 15.3 | 2,300 | 0.45 | 18.2 |
| 230 | 24 | 100 | 8 | 11.5 | 1,150 | 0.51 | 19.0 |
| 350 | 7.3 | 100 | 8 | 7.6 | 250 | 0.36 | 17.6 |

Common conditions.—(1) 200 liters of kerosene used as polymerization solvent; (2) Triethylaluminum concentration=1 mmole per liter solvent; (3) Carrier-Ti component concentration=100 mg. per liter solvent; (4) Polymerization conducted at 140° C. for 1 hour at total pressure of 40 kg./cm.².

EXAMPLE 8

In 1.5 liters of water were dissolved 1 mole of magnesium acetate and 2 moles of aluminum sulfate, and the pH of the solution was raised to 10 by addition of an aqueous solution of sodium carbonate to form precipitates.

The precipitates were recovered by filtration, washed with water, dried, ground and calcined at 600° C. for 4 hours to obtain a solid having an average praticle size of 15 microns and a Mg/Al atomic ratio of 0.48. When this solid was subjected to a heat treatment at 950° C. for 2 hours, the weight loss was 3.3%. The so obtained solid was reacted with titanium tetrachloride in the same manner as in Example 1. As a result, the titanium component was bonded to the solid carrier in an amount, calculated as titanium atom, of 24 mg. per gram of the carrier component. With use of 70 mg. of the resulting carrier-titanium component and 1 millimole of triethyl aluminum, ethylene was polymerized under the same conditions as in Example 1. Thus there was obtained 85 g. of polyethylene having a melt index of 0.43 and a $\overline{M}_w/\overline{M}_n$ value of 18.4. The yield of polyethylene per milligram atom of titanium was 2430 g.

EXAMPLE 9

In 10 liters of water was suspended 15 moles of commercially available basic magnesium carbonate, and the suspension was added dropwise to a solution of 5 moles of aluminum nitrate (nonahydrate) in 5 liters of water over a period of 30 minutes. The reaction mixture was gelled while generating carbon dioxide gas. Then, 50 liters of water was further added to the reaction mixture and the agitation was continued for 30 minutes. The pH of the mixture was raised to 9 by addition of ammonium carbonate, and the mixture was stirred for 1 hour and allowed to stand still overnight. The resulting precipitates were recovered by filtration, washed sufficiently with water and dried at 80° C, for 50 hours.

As a result, there was obtained 1.22 kg. of a compound having a composition expressed by the following formula:

$$2.8MgO \cdot AlO_{1.5}4H_2O$$

When 1 kg. of the so obtained double oxide of magnesium and aluminum was calcined at 700° C. for 1 hour, there was obtained a solid having a specific surface area of 190 m.²/g. and exhibiting a weight loss of 2.38% when heat treated at 950° C. for 2 hours. Then 300 g. of the so obtained carrier having an average particle size of about 40 microns was suspended in 1500 ml. of titanium tetrachloride, and the suspension was heated at 80° C. for 1 hour. The resulting mixture was filtered to separate solids, from which free titanium tetrachloride was removed with use of hexane. Thus there was obtained a carrier-titanium component in which the titanium component was bonded to solid carrier in an amount, calculated as titanium atom, of 18 mg. per gram of the carrier.

With use of 70 mg. of the so obtained carrier-titanium component and 1 millimole of tri-iso-butyl aluminum, ethylene was polymerized under the same conditions as in Example 1. As a result, there was obtained 14.0 kg. of polyethylene having a melt index of 0.46 and a $\bar{M}_w/\bar{M}_n$ value of 0.46. The yield of polyethylene per milligram atom of titanium was 2660 g.

When a hollow bottle was prepared from the so obtained polyethylene by a blow molding technique, the resin extrusion pressure was low and the surface condition of the molded product was very excellent.

EXAMPLE 10

To a dispersion of 1 mole of magnesia in 1 liter of water was added dropwise over a period of 30 minutes an aqueous solution of 1 mole of aluminum acetate in 500 cc. of water. The resulting mixture was stirred for 30 minutes and the pH was raised to 9.5 by addition of sodium hydroxide, after which the mixture was further stirred for 1 hour and allowed to stand still overnight.

The resulting precipitates were recovered by filtration, washed with water, dried, ground and calcined at 500° C. for 2 hours. The calcined solid product had a Mg/Al atomic ratio of 0.95 and exhibited a weight loss of 4.5% when treated at 950° C. for 2 hours.

The resulting carrier was suspended in titanium tetrachloride in an amount of 1 g. per 5 cc. of titanium tetrachloride, and a carrier-titanium component was prepared in the same manner as in Example 1. The titanium component was bonded to the carrier in an amount, calculated as titanium atom, of 20 mg. per gram of the carrier.

A 2-liter autoclave was charged with 1 liter of kerosene, 1 millimole of triethyl aluminum and 80 mg. of the so obtained carrier-titanium component, and the temperature was raised to 140° C. Then hydrogen was introduced at a partial pressure of 6 kg./cm.² and ethylene was continuously fed so that the total pressure would be maintained at 40 kg./cm.². The polymerization was continued for 1 hour. As a result there was obtained 84 g. of polyethylene having a melt index of 0.42 and a $\bar{M}_w/\bar{M}_n$ value of 16.1. The yield of polyethylene per milligram atom of titanium was 2520 g.

EXAMPLE 11

A 2-liter autoclave was charged with 1 liter of refined kerosene, 50 mg. of the carrier-titanium component prepared in Example 1, 1 millimole of triethyl aluminum, and 320 millimoles of 1-hexene, and the temperature was raised to 140° C. Then hydrogen was introduced in the autoclave at a partial pressure of 2 kg./cm.² and ethylene was continuously fed so that the total pressure would be maintained at 40 kg./cm.². The polymerization was continued for 1 hour. As a result, there was obtained 68 g. of polyethylene having a melt index of 0.20, a density of 0.941 and a $\bar{M}_w/\bar{M}_n$ value of 19.4 and containing 4.8 methyl groups per 1000 carbon atoms.

When the above run was repeated by employing 40 g. of styrene instead of 1-hexene, there was obtained 71 g. of polyethylene having a melt index of 0.10 and a $\bar{M}_w/\bar{M}_n$ value of 18.7 and containing 3 phenyl groups per 1000 carbon atoms.

EXAMPLE 12

A 2-liter autoclave was charged with 1 liter of refined kerosene, 150 mg. of the carrier-titanium component prepared in Example 1 and 1 millimole of triethyl aluminum, and the temperature was raised to 140° C. Then hydrogen was introduced in the autoclave at a partial pressure of 8 kg./cm.² and an ethylene:butadiene mixed gas of 95:5 volume ratio was continuously fed so that the total pressure would be maintained at 45 kg./cm.². The polymerization was continued for 1 hour. As a result, there was obtained 68 g. of polyethylene having a melt index of 0.5 and a $\bar{M}_w/\bar{M}_n$ value of 18.0 and containing 1.5 trans-double bonds per 1000 carbon atoms.

When the above run was repeated by employing an ethylene:isoprene mixed gas of 95:5 volume ratio instead of the ethylene:butadiene mixed gas, there was obtained 59 g. of polyethylene having a melt index of 0.22 and a $\bar{M}_w/\bar{M}_n$ value of 17.4 and containing 1.2 trans-double bonds per 1000 carbon atoms.

EXAMPLE 13

A 2-liter autoclave was charged with 1 liter of refined kerosene, 1 millimole of triethyl aluminum and 100 mg. of the carrier-titanium component of Example 1, and the temperature was raised to 140° C. A gaseous mixture of ethylene:hydrogen:propylene of 85:2:40 molar ratio was continuously fed so that the total pressure would be maintained at 40 k./cm.², and the polymerization was continued for 1 hour. As a result there was obtained 71 g. of polyethylene having a melt index of 0.97, a density of 0.923 and a $\bar{M}_w/\bar{M}_n$ value of 19.2 and containing 30 methyl groups per 1000 carbon atoms.

EXAMPLE 14

A 2-liter autoclave was charged with 1 liter of refined kerosene, 1 millimole of tri-iso-butyl aluminum and 100 mg. of the carrier-titanium component prepared in Example 1, and then dicyclopentadiene or ethylidene norbornene was added thereto. The temperature was raised to 140° C. and hydrogen was introduced under a partial pressure of 6 kg./cm.². Then ethylene was continuously fed so that the total pressure would be maintained at 40 kg./cm.². The polymerization was continued for 1 hour. Results are shown in Table 7.

TABLE 7

| Diolefine copolymerized | | Resulting polyethylene | | | |
|---|---|---|---|---|---|
| Kind | Amount (millimole per liter of kerosene) | Melt index | Yield (g.) | $\bar{M}_w/\bar{M}_n$ | Number of copolymerized groups per 1,000 carbon atoms |
| Dicyclopentadiene | 20 | 0.13 | 51 | 18.4 | [1] 0.8 |
| Ethylidene norbornene | 40 | 0.11 | 49 | 18.8 | [2] 0.8 |

[1] Dicyclopentadiene.  [2] Ethylidene norbornene.

What we claim is:

1. In a process for polymerizing ethylene or copolymerizing ethylene with a comonomer selected from the group consisting of 1-olefines having from 3 to 8 carbon atoms and diolefines having from 4 to 10 carbon atoms, in an inert solvent in the presence of a catalyst comprising a titanium or vanadium halogen compound bonded onto the surface of inorganic solid particles, and an organoaluminum compound or a dialkyl zinc; the improvement wherein said inorganic solid particles are particles of a synthetic double oxide of magnesium and aluminum prepared by coprecipitation of magnesium and aluminum salts or by co-gelling wherein a water-insoluble magnesium compound selected from magnesia, magnesium hydroxide and magnesium carbonate is suspended in water and the suspension reacted with a aqueous solution of an aluminum salt, said synthetic double oxide having an atomic ratio of Mg/Al in the range of from 0.02 to 100:1.

2. The process of claim 1, wherein said particles of said synthetic douuble oxide have an average particle diameter exceeding about 0.1 micron but not greater than 100 microns and a specific surface area of not less than 20 m.$^2$/g.

3. The process of claim 1, wherein said particles of said synthetic double oxide have an average particle diameter exceeding 1 micron but not greater than 70 microns and a specific surface area in the range of from 40 to 500 m.$^2$/g.

4. The process of claim 1, wherein said comonomer is selected from the group consisting of propylene, 1-butene, styrene, butadiene, isoprene, ethylidenenorbornene and dicyclopentadiene.

5. The process of claim 1, wherein said titanium or vanadium halogen compound is selected from the group consisting of titanium tetrahalides, alkoxy titanium trihalides, dialkoxy titanium dihalides, trialkoxy titanium halides, vanadium tetrahalides and vanadium oxytrihalides.

6. The process of claim 5, wherein said titanium or vanadium halogen compound is selected from the group consisting of titanium tetrachloride, titanium tetrabromide, ethoxy titanium trichloride, di(n-butoxy) titanium dichloride, tri(iso-propoxy) titanium chloride, vanadium tetrachloride and vanadium oxychloride.

7. The process of claim 1, wherein said synthetic double oxide of magnesium and aluminum is expressed by the following composition formula:

$$mMgO \cdot AlO_{1.5} \cdot nH_2O$$

wherein $m$ is a positive number of from 0.02 to 100, and $n$ is 0 (zero) or a positive number up to 4.

8. The process of claim 7, wherein $m$ in said formula represents a positive number of from 0.1 to 10.

9. The process of claim 1 wherein said synthetic double oxide of magnesium and aluminum is one that has been heat-treated at a temperature ranging from 200 to 1000° C.

10. The process of claim 1, wherein the atomic ratio of Mg/Al is in the range of from 0.1 to 10:1.

11. The process of claim 1, wherein said organoaluminum compound is selected from the group consisting of trialkylaluminum compounds, dialkylaluminum halides, dialkylaluminum alkoxides, dialkylaluminum phenoxides, dialkylaluminum hydrides, alkylaluminum alkoxyhalides and alkylaluminum sesquihalides.

References Cited

UNITED STATES PATENTS

| | | | |
|---|---|---|---|
| 3,166,542 | 1/1965 | Orzechowski et al. | 260—94.9 |
| 3,506,633 | 4/1970 | Matsuura et al. | 260—94.9 |

FOREIGN PATENTS

| | | |
|---|---|---|
| 2,014,330 | 4/1970 | France. |
| 1,904,815 | 9/1969 | Germany. |
| 1,140,649 | 1/1969 | Great Britain. |
| 1,938,461 | 5/1970 | Germany. |

JAMES A. SEIDLECK, Primary Examiner

E. J. SMITH, Assistant Examiner

U.S. Cl. X.R.

252—429 C, 430; 260—88.2 C, 88.2 D, 94.9 DA